Feb. 11, 1941. J. R. THORP ET AL 2,231,555
BUMPER SUPPORTING GUARD
Original Filed Feb. 9, 1938
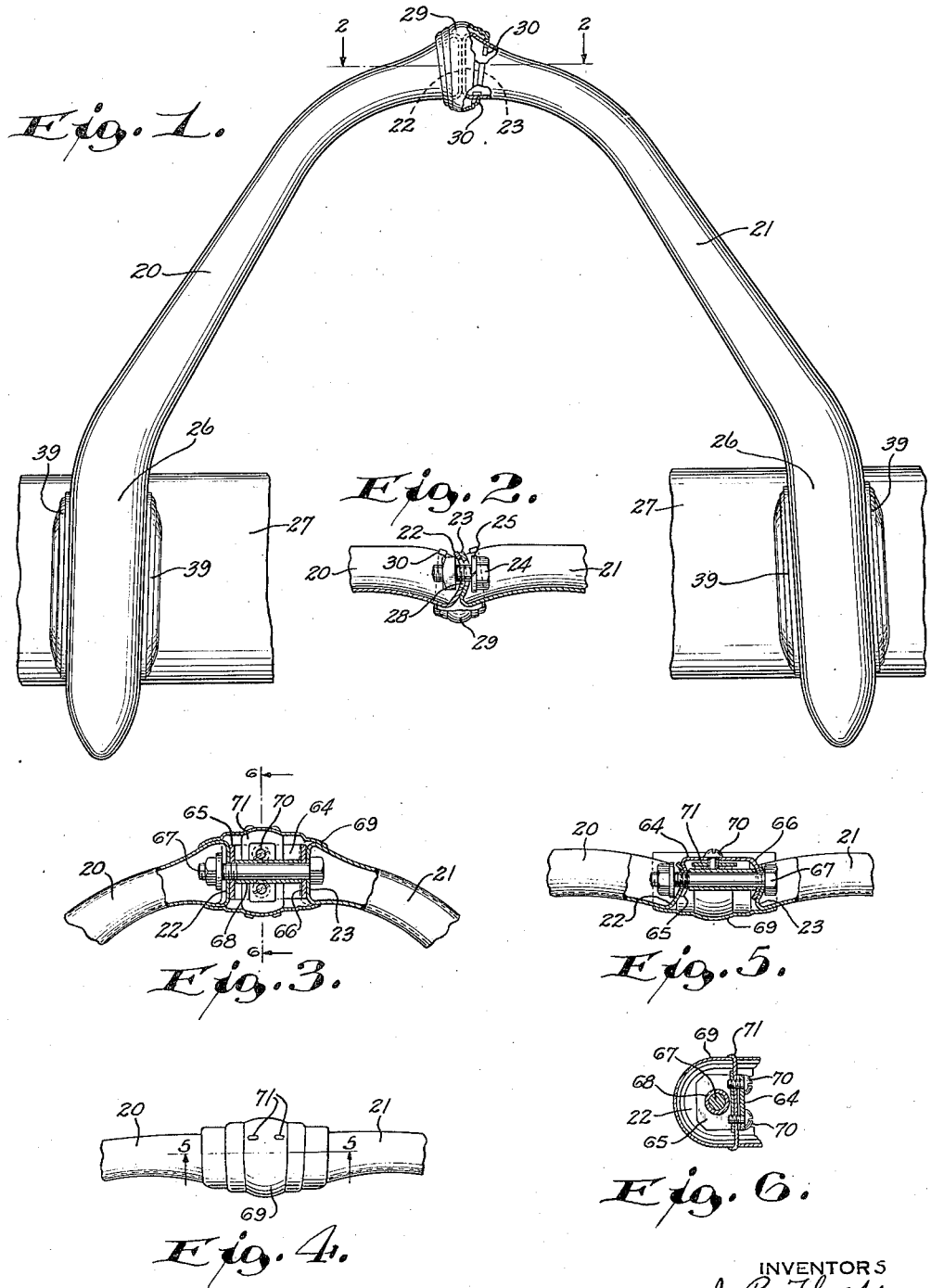
INVENTORS
J. R. Thorp
S. Strand
BY Morsell, Lieber & Morsell
ATTORNEYS Patented Feb. 11, 1941

2,231,555

UNITED STATES PATENT OFFICE 2,231,555

BUMPER SUPPORTED GUARD

Joel R. Thorp and Steen Strand, West Allis, Wis., assignors, by mesne assignments, to American Chain & Cable Company, Inc., a corporation of New York Original application February 9, 1938, Serial No. 189,495. Divided and this application July 14, 1939, Serial No. 284,434

8 Claims. (Cl. 293—55)

This invention relates in general to improvements in the art of manufacturing protective devices for vehicles, and relates more particularly to improvements in the construction and operation of guards adapted to be mounted forwardly or rearwardly of an automobile for the purpose of protecting adjacent structure such as the radiator grille and body of the car.

The present application is a division of our copending application Serial No. 189,495, filed February 9, 1938, Patent No. 2,214,513, September 10, 1940.

Generally defined, an object of this invention is to provide an improved bumper supported guard which is simple and durable in construction, and which may be readily applied to a bumper so as to most effectively perform its intended service.

A more specific object of our present invention is to provide an improved sectional guard assemblage of considerable lateral width, the several sections of which can be conveniently and rigidly interconnected and attached to bumpers of various types.

Another specific object of the invention is to provide an improved bumper supported guard of the inverted V or U-shaped type, adapted for application to either the front or the rear bumper of a vehicle.

A further specific object of this invention is to provide a new and useful guard structure which is exceptionally rigid in construction, which may be manufactured at moderate cost from sheet metal with the aid of punches and dies, and which will moreover present a neat and highly finished appearance when associated with a vehicle.

Still another specific object of this invention is to provide a guard which may be conveniently applied as an accessory to many types of standard bumpers, and which may also be varied in width to suit the whims of the user.

These and other specific objects and advantages of our invention will be apparent from the following detailed description:

A clear conception of the several features constituting this improvement, and of the mode of constructing and of applying several types of the improved bumper supported guards, may be had by referring to the drawing accompanying and forming a part of this specification wherein like reference characters designate the same or similar parts in the various views.

Fig. 1 is a front view of one of our improved bumper supported guards, showing the same applied to fragments of an automobile bumper, and having a portion of the top thereof broken away;

Fig. 2 is a horizontal section taken through a fragment of the upper portion of the guard, the section being taken along the line 2—2 of Fig. 1;

Fig. 3 is a part sectional view of the upper portion of one of the improved guards, showing the mode of separating the guard sections so as to increase the overall width of the guard;

Fig. 4 is a top view of the assemblage of Fig. 3;

Fig. 5 is a vertical section through the assemblage of Figs. 3 and 4, taken along the line 5—5 of Fig. 4; and Fig. 6 is a transverse vertical section through the same assemblage, taken along the line 6—6 of Fig. 3.

Referring to the drawing, the improved bumper supported guard shown therein comprises in general, two similar but reversely directed side members 20, 21 formed of sheet metal and having their respective upper ends provided with curved coacting flanges 22, 23 adapted to be adjustably but firmly interconnected by means of a clamping bolt 24 and lock washer 25, while their lower end portions 26 are similarly formed for rigid attachment to a vertically and horizontally curved bumper 27. The adjoining upper flanges 22, 23 of the sections or members 20, 21 are so curved as to permit relative angular adjustment of these sections in such manner that the lower end portions 26 will properly coact with bumpers 27 having different horizontal or longitudinal curvature, and the bolt 24 coacts with slots 28 in the flanges 22, 23 so as to permit such adjustment. The joint between the upper ends of the members 20, 21 may be concealed by means of an ornamental escutcheon plate 29 having ears 30 passing through holes in the member ends, or being otherwise secured to the members 20, 21. The members 20, 21 are preferably formed with the aid of punches and dies from relatively heavy sheet metal, and these side members preferably have U-shaped or dished transverse cross-section and have the flanges 22, 23 formed integral therewith. The lower end portions 26 of the two members 20, 21 are of like formation; and the opposite side flanges of these portions coact with the outer curved face of the bumper 27 through distortable adapters 39, and may be rigidly attached to the bumper bar in any suitable manner, as by removable clamps.

The mode of assembling and of attaching the bumper supported guard of Figs. 1 and 2 to a bumper, should be clearly apparent from the foregoing description, and the curvature of the coacting flanges 22, 23 will obviously permit relative swinging adjustment of the members 20, 21 so as to bring the rear edges of the flanges of the lower member portions 26 into proper initial engagement with the front face of the bumper 27.

It may in some cases be desirable to widen the guard assemblage, and with the improved construction, such widening may readily be effected in the manner specifically shown in Figs. 3 to 6 inclusive. Here the side members 20, 21 are separated the desired distance, and a spacer 64 is inserted between the flanges 22, 23 of the side members. This spacer 64 has curved end flanges 65, 66 formed for coaction with the flanges 22, 23 respectively, and a long bolt 67 passes through alined slots in all of the flanges. The spacer flanges 65, 66 are spaced apart by means of a sleeve 68 embracing the bolt 67, and an elongated escutcheon cover 69 of decorative design is utilized to conceal the spacer 64 and the joints. The cover 69 may be detachably secured to the spacer 64 by means of screws 70 coacting with a vertical retainer plate 71, or in any other manner, and the curved surfaces of coaction between the flanges 22, 23, 65, 66 will obviously permit the side members 20, 21 to be adjusted so as to insure proper coaction between the lower member portions 26 and bumpers 27 of various shapes.

From the foregoing detailed description it will be apparent that our present invention provides an improved bumper supported guard assemblage which may be conveniently applied to bumpers of various shapes while preserving a neat and highly finished appearance. The improved spacer cooperable with the flanges 22, 23 of the side members 20, 21 will permit ready variation in the overall width of the guard, and the various elements of the structure may be readily manufactured from sheet metal with the aid of punches and dies, and produce a durable assemblage when properly associated with each other. The invention has proven highly successful in actual commercial use and produces a guard assemblage which is extremely attractive in appearance and which may be readily applied to most standard automobile bumpers.

It should be understood that it is not desired to limit this invention to the exact details of construction or to the precise mode of use, herein shown and described, for various modifications within the scope of the claims, may occur to persons skilled in the art.

We claim:

1. A bumper supported guard, comprising, a pair of similar side members having lower portions formed for attachment to a bumper and having upper end portions extending toward each other, said end portions having laterally curved surfaces of coaction for permitting relative lateral angular adjustment of the members, and means for rigidly connecting said members.

2. A bumper supported guard, comprising, side members each having a lower portion formed for attachment to a bumper and having their upper ends formed with laterally curved surfaces facing each other, and means for rigidly connecting said members adjacent said surfaces, the curvature of said surfaces permitting relative lateral angular adjustment of the members.

3. A bumper supported guard, comprising, a pair of similar side members having lower portions formed for attachment to a bumper and having upper end portions extending toward each other, said end portions having laterally curved surfaces of coaction for permitting relative lateral angular adjustment of the members, means for rigidly connecting said members, and an escutcheon secured to said members and covering the joint at said connecting means.

4. A bumper supported guard, comprising, similar side members having lower portions formed for attachment to a bumper and having laterally curved upper surfaces facing each other, a spacer interposed between and coacting with said surfaces, and means for rigidly connecting said members and said spacer, said surfaces being formed to permit relative lateral angular adjustment of said members.

5. A bumper supported guard, comprising, a pair of side members of channel shaped transverse cross-section each having a lower portion formed for attachment to a bumper and also having an upper end portion extending toward the upper end portion of the other member, said upper end portions having integral flanges provided with laterally curved surfaces of coaction for permitting relative lateral angular adjustment of the members, and means for rigidly connecting said flanges.

6. A bumper supported guard, comprising, a pair of side members of channel shaped transverse cross-section each having a lower portion formed for attachment to a bumper and also having an upper end portion extending toward the corresponding end portion of the other member, said upper end portions having integral flanges provided with laterally curved surfaces, a spacer interposed between and having end surfaces coacting with said curved flange surfaces to permit relative lateral angular adjustment of the members, and means for rigidly interconnecting said flanges and said spacer.

7. A vertical guard for attachment to horizontal bumper bars of different lengthwise curvatures and configuration, at points in the same or angularly related vertical planes, comprising laterally spaced upstanding members having lower portions similarly formed for attachment to bumper bars, laterally curved opposed spaced faces on the upper portions of said members and a horizontally extending member located between the upper portions of said upstanding members and having laterally curved end faces complemental to and engaging said laterally curved faces on said upstanding members, whereby said upstanding members may be angularly adjusted with respect to said horizontally extending member and with respect to each other to permit the lower portions of said upstanding members to be brought into proper cooperative relation to the points of attachment on the horizontal bumper bar.

8. A vertical guard for attachment to horizontal bumper bars of different lengthwise curvatures and configuration, at points in the same or angularly related vertical planes, comprising laterally spaced upstanding members having lower portions similarly formed for attachment to bumper bars, and laterally curved opposed cooperatively engaged faces on the upper portions of said members, whereby said upstanding members may be angularly adjusted with respect to each other to permit the lower portions of said members to be brought into proper cooperative relation to the points of attachment on the horizontal bumper bar.

JOEL R. THORP.
STEEN STRAND.